E. B. LYDICK.
FRUIT KNIFE.
APPLICATION FILED AUG. 14, 1912.
1,072,243.
Patented Sept. 2, 1913.
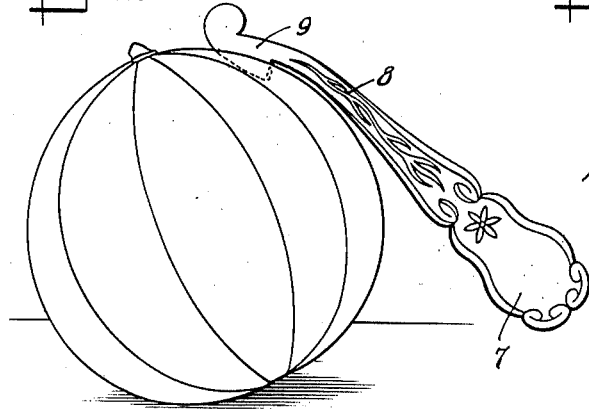
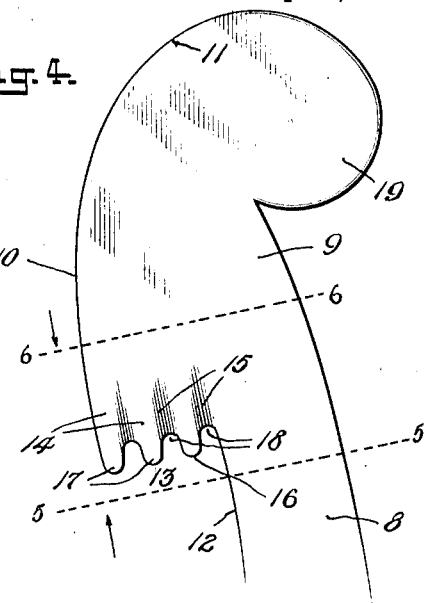
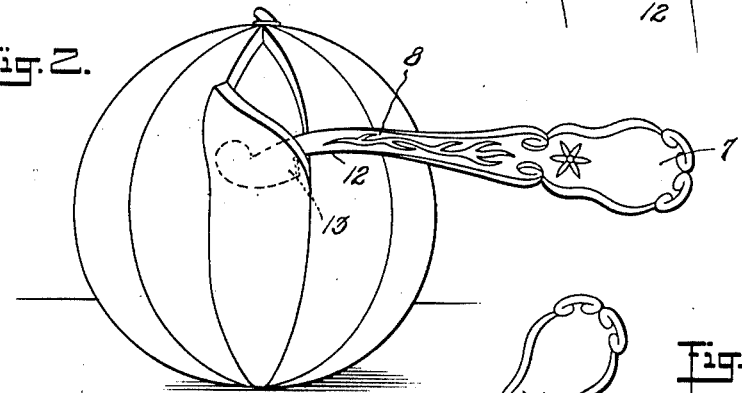
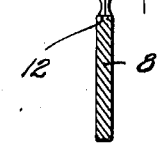
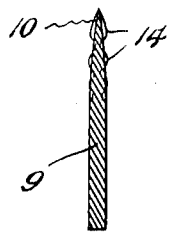
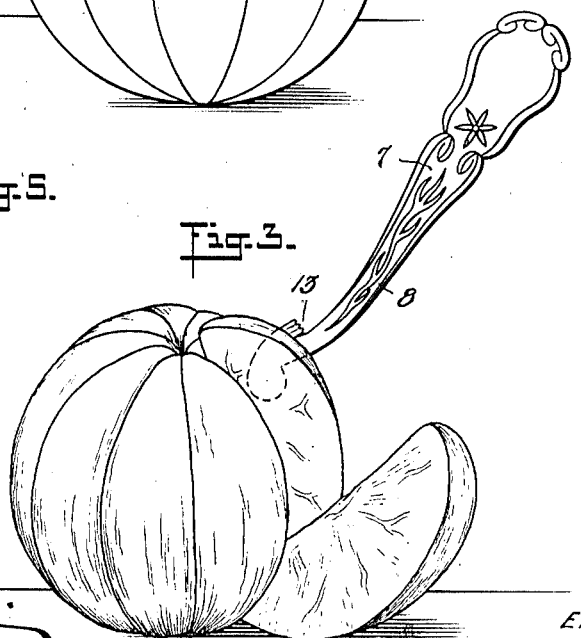
WITNESSES
INVENTOR
ERNEST B. LYDICK
BY
ATTORNEYS

UNITED STATES PATENT OFFICE.

ERNEST B. LYDICK, OF PITTSBURGH, PENNSYLVANIA.

FRUIT-KNIFE.

1,072,243.   Specification of Letters Patent.   Patented Sept. 2, 1913.

Application filed August 14, 1912. Serial No. 714,991.

*To all whom it may concern:*

Be it known that I, ERNEST B. LYDICK, a citizen of the United States, and a resident of Pittsburgh, in the county of Allegheny and State of Pennsylvania, have invented a new and Improved Fruit-Knife, of which the following is a full, clear, and exact description.

This invention relates to a fruit knife or peeler for removing the skin from oranges, lemons or other citrous fruits, and an object of my invention is to provide a knife having means for slitting the skin in sections, means for removing the skin and white pulp, and means for separating the sections of the fruit.

The primary object of my invention is to provide a knife of the nature indicated which has a slitting blade in addition to the peeling or scraping blade, the slitting blade being so formed and arranged with respect to the other parts of the device as to serve to hold the knife at a proper or desired depth in the fruit skin when the cut is being made. That is to say, the slitting blade will not only hold itself in the skin while the slitting is being done, but it will glide safely over the inner skin without cutting it and permitting the juice to escape and waste or soil the operator's hands or napkin.

A further object of my invention is to construct a simple and neat appearing one-piece article of the above-outlined character.

Reference is to be had to the accompanying drawings, forming a part of this specification, in which similar characters of reference indicate corresponding parts in all the views, and in which—

Figure 1 is a side elevation of a preferred embodiment of my invention shown in position for slitting the skin of an orange; Fig. 2 is a view similar to Fig. 1, showing the knife in position to separate the skin and white pulp from the orange; Fig. 3 is a similar view with the knife in position to separate the peeled orange into its sections; Fig. 4 is an enlarged face view of one side of the head of the knife; Fig. 5 is a transverse sectional view taken adjacent the end of the head on the line 5—5 of Fig. 4; and Fig. 6 is a similar view taken on the line 6—6 of Fig. 4 looking in the opposite direction.

Described more in detail, I show a substantially flat integral device consisting of a handle 7 of any suitable outline or configuration and having a curved shank 8, at the end of which is an enlarged head 9 shaped in the form of a volute. The head is provided with a sharp edge 10, extending approximately out to the place indicated at 11, forming thereby a peeling or scraping blade, among the uses of which is to separate the outer skin and white pulp from the inner skin, as illustrated in Fig. 2.

The curve 12 of the shank 8 adjacent the head is intended to conform more or less to the shape of the outer surface of the fruit as the knife is passed around the same in meridian lines, and where the shank merges into the head 9 there is formed a peculiar slitting blade 13 providing a shoulder substantially at right angles to the edges 10 and 12. The slitting blade comprises a series of beads or ribs 14 parallel to the peeling edge 10 and formed by pairs of oppositely disposed grooves 15 ground or otherwise formed in the faces of the head 9, as shown particularly in Figs. 4 and 5. These beads 14 formed as shown by the lateral opposing corrugations serve to hold the slitting blade in the skin while making the cut, without undue pressure on the handle. The edge of the slitting blade, directed toward the handle, is sufficiently sharp for its purpose and when inserted into the skin the beads 14, one or more of them being embedded therein, will cause the knife to maintain a proper depth in the skin with the minimum amount of effort on the part of the operator. Furthermore, the shoulder incident to the slitting blade serves as a guide or gage for the peeling blade when used as indicated in Fig. 2 for severing the skin and pulp from the inner skin.

In addition and supplemental to the aforesaid lateral corrugations of the knife blade or head, the edge of the slitting blade, as shown in Fig. 4, is corrugated or convoluted, the sinuous line 16 defining such edge being formed of a continued succession of convex and concave portions 17 and 18, forming respectively the outer ends of the beads 14 and the grooves 15, aforesaid. Said edge or sinuous line 16 lies in a plane coincident with the handle midway of its sides (see Fig. 5) and is sharp throughout its extent between the edges 10 and 12, whereby the actual slitting or splitting of the skin is effected. In other words, the convolutions of the sinuous edge 16 form the ends of the beads 14 into a series of parallel fingers projecting in the direction in which the knife is drawn during the slitting operation, and each finger terminates in a dish-like edge, sharp enough for its slitting purpose, but not so sharp as to interfere with the function of the beads and fingers as elements to regulate the depth of the slit.

As shown in Fig. 4, the fingers constituting the ends of the beads 14 are of substantially the same length and have their extreme outer ends lying in a line at right angles to the edges 10 and 12. Furthermore, the axes of the beads and fingers all lie in the plane represented by the line 16 in Fig. 5.

While the entire blade or head 9 is comparatively thin, the rounded portion 19 thereof beyond the end 11 of the peeling edge, is relatively dull or blunt. By virtue of this portion, therefore, the device is applicable, as shown in Fig. 3, to separate the natural sections of the fruit without rupturing the inner skin.

Having thus described my invention, I claim as new and desire to secure by Letters Patent:

1. A fruit knife comprising a handle, a peeling blade, and a slitting blade arranged between and angularly to the handle and blade and having a sinuous cutting edge, all of the curves of said sinuous edge lying in the same plane.

2. A fruit knife comprising a handle having a curved edge, a sinuous-edged slitting blade extending as a whole at a right angle from said edge of the handle, said sinuous edge lying in the plane of the middle of the handle, and a separating blade extending from the slitting blade, said separating blade having cutting and dull portions.

3. A fruit knife comprising a handle and a head, said head comprising a rounded separating portion, a slitting blade, and a peeling blade between the separating portion and the slitting blade, said slitting blade having one or more beads parallel to the edge of the peeling blade, each bead being formed by a pair of grooves formed directly opposite each other in the faces of the head.

4. A fruit knife comprising a peeling blade, a handle, and a slitting blade arranged between and at an angle to the peeling blade and the handle, said slitting blade consisting of a series of parallel beads having their axes lying in the same plane and each bead terminating in a cutting finger.

5. A fruit knife comprising a handle and a slitting blade arranged at an angle thereto, said blade consisting of a series of parallel beads having their axes lying in the same plane and formed by lateral opposing corrugations.

6. A fruit knife comprising a handle and a slitting blade, said blade comprising a plurality of fingers having their axes lying in the same plane and extending parallel to said handle the ends of said fingers being rounded and terminating in a line substantially at right angles to said handle.

In testimony whereof I have signed my name to this specification in the presence of two subscribing witnesses.

ERNEST B. LYDICK.

Witnesses:
 IDA L. SHERRER,
 T. W. DAVIDSON.